multivibrator into its quasi-stable state takes place immediately after the multivibrator recovers from a previous operating cycle. Thus, as the capacitor 40 discharges through resistors 42 and 44 to bring transistor 26 above cut-off, another negative-going triggering signal is received. As a result, a number of positive-going output pulses 78*a* are produced, and in the limit, the output at the base of transistor 28 is a substantially steady voltage of the same value as the amplitude of pulses 78*a*. The frequency of waveform 10*a* will thus produce the highest integrated voltage in the integrating means for application to the gate electrode of silicon-controlled rectifier 62. The biasing of silicon-controlled rectifier 62 may be adjusted by variable resistor 70 so that silicon-controlled rectifier 62 will produce an output at terminal 74 only for a selected high value of voltage on its gate electrode. An output from the rectifier will then be produced only for an input at a selected frequency or range of input frequencies near the frequency of waveform 10*a*.

For input waveform frequencies substantially greater than that of waveform 10*a*, it will be appreciated that the multivibrator will not recover in time to be reactivated by the next negative-going triggering signal, whereby the voltage at the rectifier gate electrode drops. However, if this fact alone were depended upon to produce frequency selection, an ambiguity would result. An output would also be produced for each harmonic or multiple of a selected input frequency. That is, any input waveform supplying negative-going impulses in phase with those illustrated at 46*a* would also produce maximum output.

In accordance with the present invention, however, a reset circuit, including capacitor 48 and resistor 52 forming a differentiating means, provides triggering signals 54 for application to the base of transistor 28 through diode 50. This circuit acts to reset the multivibrator from its quasi-stable state to its stable state for concluding its cycle of operation before the normal recovery time thereof. This type of operation is illustrated by the waveform chart of FIG. 4 in which the waveforms 10*b*, 22*b*, 46*b*, 76*b*, and 78*b*, corresponding to similarly numbered waveforms of FIGS. 2 and 3 hereinbefore discussed. Input waveform 10*b* has a frequency higher than the frequency to be selected by the circuit according to the present invention. Again, clipped version 22*b* produces triggering signals 54*b* as well as triggering signals 46*b* (not shown) which are substantially identical to triggering signals 54*b*. The multivibrator is triggered into its quasi-stable state of operation as indicated from waveforms 76*b* and 78*b* for every other negative-going triggering signal. It is noted that the waveform 76*b* produced at the base of transistor 26 has not reached the cut-off value 80*b* by the time an intervening negative-going triggering signal 82 is received. However, the last mentioned negative-going triggering signal is coupled through diode 50 to conclude the duration of the operation cycle or quasi-stable state of the multivibrator prematurely or before discharge of capacitor 40 to cut-off value 80*b*. The multivibrator is thereby shut off. It will be appreciated that the multivibrator will be triggered into operation for every other negatice-going triggering signal, with the intervening negative-going triggering signals having the opposite effect. Therefore, an output 78*b* is produced which is present approximately half the time, for the case when input frequencies are above the selected frequency. Integration of waveform 78*b* by the integrating means, comprising resistors 56 and 58, and capacitor 60, will produce a value at the gate electrode of silicon-controlled rectifier 62 approximately half the maximum value. It is important to note that the same waveform will be applied to the integrating means for all frequencies above the selected frequency, that is above the frequency previously illustrated by waveform 10*a*. Thus, alternate negative-going triggering signals will turn the multivibrator alternately off and on, even though the input frequency is some multiple or harmonic of the selected frequency. Therefore, a false output or triggering of silicon-controlled rectifier 62 is not produced for such harmonics.

A response curve for the variation of voltage at the gate electrode of silicon-controlled rectifier 62 with frequency is illustrated at 84 in FIG. 5. It is seen that the gate voltage increases with frequency until a maximum value is reached corresponding to the selected frequency, after which such voltage drops in half. Triggering of the silicon-controlled rectifier 62 takes place in accordance with the bias values set by variable resistor 70 and as indicated by dashed line 86 in FIG. 5. The silicon-controlled rectifier will conduct and produce an output for a range of frequencies depending on this setting of variable resistor 70. As the resistance of resistor 70 is increased in value, dropping the voltage at the cathode of silicon-controlled rectifier 62, the bias indicated by the position of the dashed line 86 will be effectively lowered so that triggering of the silicon-controlled rectifier takes place for a wider band of frequencies extending between the crossings of dashed line 86 and the response curve. If the value of resistor 70 is decreased, raising the voltage at the cathode of silicon-controlled rectifier 62, dashed line 86 will in effect be raised, reducing the band of input frequencies which will produce triggering of the silicon-controlled rectifier. Thus, the circuit has variable selectivity as controlled by the SCR biasing.

In practice, the present circuit is found to be quite selective. A five percent change in frequency will produce a voltage change, for example, from .7 to .85 volt, at the peak of curve 84. Then, if the frequency is increased further, the voltage drops approximately in half. This significant and measurable change can be easily applied to operate the silicon-controlled rectifier or other means that might be substituted therefor, e.g. another monostable multivibrator, a biased differential amplifier, or the like.

Typical frequencies which may be selected by this circuit range from portions of cycles per second to hundreds of thousands of cycles per second. The frequency at which selection occurs is here determined by adjustment of the multivibrator feedback coupling means. In the present circuit, then, resistor 42 is adjusted to change the normal duration of the quasi-stable state or operating cycle for the multivibrator and thus change the frequency of selection of the present circuit. In the specific example, the frequency selected will have a period substantially equal to the duration of the multivibrator's quasi-stable state.

The silicon-controlled rectifier can be employed in the circuit as shown to produce an output voltage, or can be used in this or other circuits to energize another portion of a radio receiver. The silicon-controlled rectifier can be used to close relays and perform functions such as the sounding of a paging alarm. In addition, the output may be used to select different charging resistors in the feedback coupling means, i.e. resistor 42 or 44, during a subsequent frequency selective operation. Thus, the circuit output may be used to change the circuit's frequency susceptibility, for employing the same circuit to detect more than one modulation frequency in a paging code sequence. Furthermore, the output may provide the basis for a bandpass filter system, e.g. for selecting the circuit input or the alternating output of the multivibrator and providing the same as a circuit output when the input falls within a given selected frequency range. Such output may be gated by a silicon-controlled rectifier or a similar circuit element. Other uses of the circuit will occur to those skilled in the art.

The circuit according to the present invention may be miniaturized within a radio receiver by utilizing integrated circuits or the like for substantially all of the transistor circuitry illustrated in FIG. 1. No bulky audio frequency selective components are used as in the usual system. Thus, a single frequency selective network is achieved wherein the frequency may be accurately selected without ambiguity and without the usual tuned circuit elements.

United States Patent Office 3,539,828
Patented Nov. 10, 1970

3,539,828

FREQUENCY DISCRIMINATOR-DETECTOR FOR DATA TRANSMISSION SYSTEM OF THE FREQUENCY SHIFT KEYING TYPE

William G. Crouse, Raleigh, N.C., assignor to International Business Machines Corporation, Armonk, N.Y., a corporation of New York

Original application Apr. 15, 1965, Ser. No. 448,521, now Patent No. 3,432,616. Divided and this application Apr. 24, 1968, Ser. No. 723,762
Int. Cl. H03k *9/06*
U.S. Cl. 307—233 3 Claims

ABSTRACT OF THE DISCLOSURE

The improved circuit responds to data in the form of an alternating current carrier at one or the other of two frequencies to produce a direct current output voltage which is at one or the other of two levels representative of a logical "1" or a logical "0" data bit. A pair of resonant circuits are each tuned to one of the frequencies; their outputs are rectified and subtracted from each other; and the resultant signal is applied to a pair of matched transistor amplifiers having their emitters connected to each other and to a low pass filter which removes the carrier from the resultant signal. The polarity of the resultant signal causes one of the amplifiers to be operated in its on or off state to produce a logical "1" or "0" level at its collector.

Figure 1B:
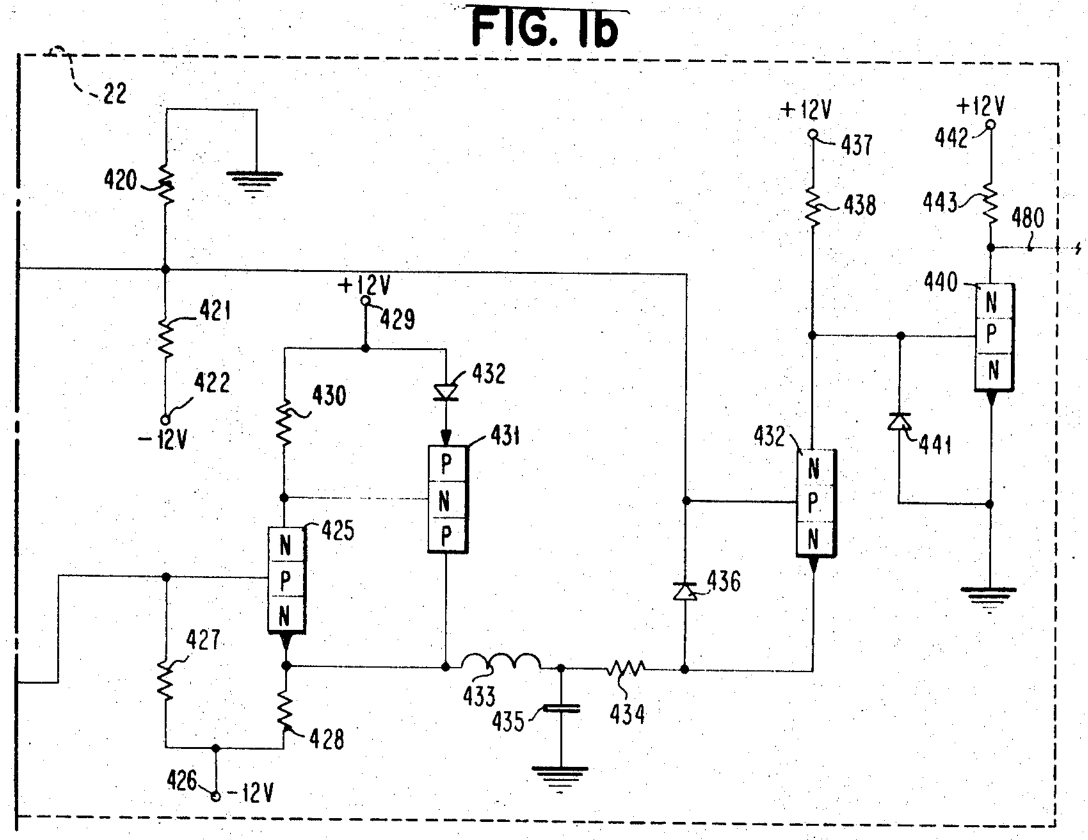

This application is directed generally to an improved frequency discriminator-detector for use in transmitting and receiving apparatus of the type utilizing frequency shift keying techniques. This application is a division of copending application of William G. Crouse, the inventor herein, Ser. No. 448,521, filed Apr. 15, 1965.

The object of the present invention is the provision of an improved discriminator and detector circuit for producing bivalued output signals in accordance with the high and low carrier signals representative of logical "0" and logical "1" data bits.

The foregoing and other objects, features and advantages of the invention will be apparent from the following more particular description of the preferred embodiment of the invention, as illustrated in the accompanying drawings.

In the drawings:

FIGS. *1a* and *1b* are a schematic diagram of a preferred embodiment of the improved discriminator-detector of the present application; and FIG. 2 illustrates the organization of FIGS. *1a* and *1b*.

The circuit 22 responds to data signals in the form of an alternating current carrier at one or the other of the two frequencies to produce a direct current output voltage which is at one or the other of two voltage levels representative of a logical "1" or a logical "0" data bit.

Substantially square wave signals are applied to a grounded emitter amplifier 380 by means of an input coupling capacitor 381. A bias resistor 382 is connected to a positive supply terminal 383 and to the base electrode of the transistor 380 to provide a bias supply for operating the transistor at a desired level. The positive half cycles of the input signal applied to the capacitor 381 tend to drive the transistor to saturation, and the negative half cycles turn the transistor 380 off.

The collector electrode of the transistor 380 is connected to a positive supply terminal 384 by way of a resistor 385. A transistor 386, connected as an emitter follower, has its base electrode and its collector electrode connected to opposite ends of the resistor 385. A diode 387, connected across the base emitter terminals of the transistor 386, conducts while the base-emitter junction of the transistor 386 is reverse biased and presents a high impedance across the base-emitter junction while the transistor 386 is conducting. Output signals from the amplifier comprising transistors 380 and 386 are applied to a pair of tank circuits 390 and 391 by way of a coupling capacitor 392 and isolating and Q determining resistors 393 and 394.

The first tank circuit 390 includes a capacitor 395 and the primary winding 396 of a transformer 397. The value of the inductance of the transformer 397 and the value of the capacitor 395 is selected so that the tank circuit 390, in the preferred embodiment, will have a resonant frequency of one kilocycle. Preferably the Q of the circuit is selected for a desired band width for the data rate; for example, 600 baud, or a band width of 600 cycles per second.

The tank circuit 391 includes a capacitor 400 and the primary winding 401 of a transformer 402. The capacitive and inductive values of the capacitor 400 and of the transformer 402 are selected so that the tank circuit 391, in the preferred embodiment, has a resonant frequency of 2200 cycles per second. The Q of the circuit is selected preferably for a band width of 600 cycles per second.

The transformer 397 includes a secondary winding 405 which is connected to a full wave rectifier including diodes 406, 407, 408 and 409. The transformer 402 includes a secondary winding 410 which is connected to a full wave rectifier comprising diodes 411, 412, 413 and 414. One terminal of each of the full wave rectifiers is connected to a positive supply terminal 415 by way of a resistor 416. The other terminal of the upper full wave rectifier is connected to a reference potential determined by the junction between a pair of resistors 420 and 421 connected in series between ground potential and a negative supply terminal 422. In a preferred embodiment of the present invention, the reference potential set by the resistors 420 and 421 and the power supply to which they are connected will be approximately −1 volt.

The other terminal of the lower full wave rectifier is connected to the base electrode of a transistor 425. The base electrode of the transistor 425 is connected to a negative supply terminal 426 by way of a bias resistor 427. The emitter electrode of the transistor 425 is connected to the terminal 426 by way of a resistor 428, and its collector terminal is connected to a positive supply terminal 429 by way of a resistor 430.

A transistor 431 has its base electrode connected directly to the collector electrode of the transistor 425 and its collector electrode connected directly to the emitter electrode of the transistor 425. Its emitter electrode is connected to the supply terminal 429 by way of a diode 432. The transistors 425 and 431 form a high gain amplifier.

The junction between the resistors 420 and 421 is also connected to the base electrode of a transistor 432, the emitter electrode of which is connected to a low frequency filter comprising a series-connected inductor 433 and resistor 434 and a capacitor 435 connected between the junction of the inductor and resistor and ground potential. The inductor 433 is also connected to the emitter electrode of the transistor 425 and to the collector electrode of the transistor 431. A diode 436 is connected across the base emitter junctions of the transistor 432, and the collector electrode of the transistor 432 is connected to a positive supply terminal 437 by way of a resistor 438.

The collector electrode of the transistor 432 is connected to the base electrode of a transistor 440, and a diode 441 is connected across base emitter electrodes of the transistor 440. The emitter electrode of the transistor 440 is connected to ground potential and its collector electrode is connected to a positive supply terminal 442 by way of a resistor 443.

As will be seen in more detail below, the circuit constants of the discriminator and detector circuit 22 are selected so that, when no signal is applied to the input capacitor 381, there is no current flowing through the low pass filter elements 433 and 444. When data signals are applied to the capacitor 381, the carrier frequency is removed by the low frequency filter, and data in digital form appears at the output of the transistor 440. This will be described in greater detail below. For the present, it will be sufficient to say that the input signals at the collector electrode of the transistor 440 are at their relatively positive level in response to each logic "1" input signal and at ground potential for logic "0's."

Square wave signals are applied to transistor 380 by way of capacitor 381. The frequency is one or the other of the two carrier frequencies representing the logical "1" or logical "0."

When the signal applied to capacitor 381 goes positive, transistor 380 is turned on, driving its collector electrode negative, forward biasing diode 387, driving the capacitor 392 to its negative level. At this time, transistor 386 is turned off.

When the negative going signal is applied to capacitor 381, the transistor 380 is switched off and its collector goes positive. This drives the base electrode of transistor 386 positive, causing the emitter electrode of transistor 386 to go to its positive level; and diode 387 is reverse biased. In this manner, the square wave coming from the limiter is amplified and inverted by an amplifier consisting of the transistors 380 and 386, and this signal is coupled to the resonant circuits 390 and 391 by way of the coupling capacitor 392.

The resonant circuit 390 develops a large amplitude when driven by a frequency representing a logical "1"; and a lower amplitude when driven by frequencies other than the logical "1." Similarly, resonant circuit 391 develops a large amplitude when the received frequency is that of the logical "0"; and it develops lower amplitude when the frequency is other than the logical "0."

The signal developed in the resonant circuit 390 is coupled to the rectifier bridge circuit by way of the transformer 397. The rectifier bridge consisting of diodes 406, 407, 408 and 409 performs a full wave rectification of the signal coming from the resonant circuit 390, such that the signal developed from the cathodes of diodes 407 and 409 to the signal at the anodes of the diodes 406 and 408 is a negative-going full wave rectification of the signal from resonant circuit 390.

Similarly, the full wave bridge circuit consisting of diodes 411, 412, 413 and 414 performs a full wave rectification of the signal on the resonant circuit 391. In this case, the signal seen on the cathodes of diodes 412 and 414, with respect to the potentials on the anodes of diodes 411 and 413, would be that of a full wave rectification signal, swinging positively.

Since the cathodes of diodes 407 and 409 are connected to a voltage source consisting of resistors 420 and 421 and the two rectifier circuits are connected in a series manner, it is found that the signal seen at the cathodes of diodes 412 and 414 would be that of the difference of the full wave rectifications of signals found on the resonant circuits 390 and 391.

For received frequencies representing a logical "1," the amplitude in the resonant circuit 390 is greater than that in the resonant circuit 391 so that the resultant signal found at the cathodes of diodes 412 and 414 is that of a negative-going rectified signal.

For a received frequency representing a logical "0," the amplitude of the signal in the resonant circuit 391 is greater than that of the signal on the resonant circuit 390 so that the resultant output signal found at the cahodes of diodes 412 and 414 is that of a positive-going full wave rectified signal.

The signal at the cathodes of diodes 412 and 414 is coupled to the base electrodes of transistor 425. Transistors 425 and 431 act as a current amplifier or isolation amplifier to couple signals from the rectifiers to the low pass filter consisting of the inductor 433 and the capacitor 435. This low pass filter passes only the average voltage coming from the rectifiers so that the carrier frequency is removed from the output signal.

If the frequency representing the logical "1" is received, the negative-going full wave rectified signal is coupled into the low pass filter so that the output of the low pass filter is at its most negative level. If the frequency representing the logical "0" is received, the input to the low pass filter is a positive-going full wave rectified signal, and the output of the filter is at its most positive level.

This positive or negative level coming from the low pass filter is coupled to transistor 432 by way of the resistor 434. If the output of the low pass filter is at its positive level, transistor 432 is switched off; if the output level from the low pass filter is at its negative level, transistor 432 is switched on. This results in transistor 432 being switched on for logical "1" signals and being switched off for logical "0" signals.

Since the output of the low pass filters moves slowly from the negative to positive levels, and similarly from the positive to negative levels, it is important that transistor 432 switches when the output of the low pass filter is near the midpoint between its maximum excursions. Otherwise, we would find that the switching of the transistor 432 would be biased in such a way so it would tend to increase the pulse width of the one type of data bit while decreasing the pulse width of the other type of data bit.

As an example, if transistor 432 switches at a level more positive than the average output level of the low pass filter, it would be found that, when the received signal changes from a logical "1" to a logical "0," it would take more time for the output of the low pass filter to reach the switching threshold than it would when the frequency changes from the logical "0" to the logical "1." As a result, it would be found that the output of transistor 432 would tend to increase the width of the logical "1" and decrease the width of a logical "0."

Similarly, if the switching threshold of transistor 432 is more negative than the average output levels from the low pass filter, the width of the logical "1" pulse would be decreased and the width of the logical "0" would be increased. In order to guarantee that this switching level is maintained close to the midpoint between the output excursions of the low pass filter, the transistors 425 and 432 have been chosen to have matched base-emitter drops. If the potential at the base of transistor 425 is the same as the potential at the base electrode of transistor 432, the transistor 432 is very near its switching threshold so that, if the base electrode of transistor 425 is driven slightly positive, transistor 432 is switched off. If the base electrode of the transistor 425 is driven slightly negative, the transistor 432 is switched on.

With no signal in the resonant circuits 390 and 391, the potential at the base electrode of transistor 425 is essentially the same as the potential at the base electrode of transistor 432. This is accomplished by having the potential at the base electrode of transistor 425 determined by the potential at the base electrode of transistor 432, plus the drops in the diode bridge consisting of diodes 406, 407, 408 and 409 minus the diode drops in the bridge consisting of diodes 411, 412, 413 and 414. The drops at the bridge circuits cancel out, thereby making the potentials of the two base terminals equal. In this manner, an extreme effort is made to have all drops within the discriminator circuit cancel out so that there will be as little error in the switching threshold of transistor 432 as is possible.

When transistor 432 is conducting, its collector current is coupled to the base electrode of transistor 440 to cause transistor 440 to switch off. When transistor 432 is not conducting, the transistor 440 will be turned on by way of the resistor 438. As a result, when logical "1" frequencies are received, transistor 440 will be on and its collector electrode will be at ground potential. When a logical "0" is received, transistor 440 will be in its off state and its collector electrode will be in its positive potential.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A discriminator-detector circuit comprising a pair of resonant circuits each tuned to a respective one of two carrier frequencies and producing output signals in response to received carrier signals, means for rectifying the output signals of each resonant circuit and for deriving signals the magnitudes of which are the difference between the amplitudes of the two rectified signals and the polarity of which is the same as that of the greater of the two rectified signals, a switching device including a pair of matched transistors having their base electrodes biased to the same potential level and having emitter electrodes;

a filter coupling the emitter electrodes to each other for filtering out the carrier frequency from the difference signal, and means applying the difference signal to the base electrode of one matched transistor to operate the other matched transistor at cutoff or in conduction in accordance with the polarity of the difference signal.

2. A discriminator-detector circuit comprising a pair of transformers each having a primary and a secondary winding;

a pair of resonant circuits, each including one of the primary windings and each tuned to a respective one of two carrier frequencies and producing signals in a secondary winding in response to received carrier signals;

means connected to each secondary winding for rectifying signals therein and for deriving signals the magnitudes of which are the difference between the amplitudes of the two rectified signals and the polarity of which is the same as that of the greater of the two rectified signals;

a switching device including a pair of matched transistors having their base electrodes biased to the same potential level and having emitter electrodes;

a filter coupling the emitter electrodes to each other for filtering out the carrier frequency from the difference signal; and means applying the difference signal to the base electrode of one matched transistor to operate the other matched transistor at cutoff or in conduction in accordance with the polarity of the difference signal.

3. A discriminator-detector circuit comprising a pair of transformers, each having a primary and secondary winding;

a pair of resonant circuits, each including one of the primary windings and each tuned to a respective one of two carrier frequencies and producing signals in the respective secondary windings in response to received carrier signals;

first and second diode rectifiers for rectifying the signals in respective secondary windings;

means connecting the rectifiers in series for deriving signals, the magnitudes of which are the difference between the amplitudes of the two rectified signals and the polarity of which is the same as that of the greater of the two rectified signals;

a switching device including a pair of matched transistors having their base electrodes biased to the same potential level and having emitter electrodes;

a filter coupling the emitter electrodes to each other for filtering out the carrier frequency from the difference signal; and means applying the difference signal to the base electrode of one matched transistor to operate the other matched transsitor at cutoff or in conduction in accordance with the polarity of the difference signal.

References Cited

UNITED STATES PATENTS

| | | | |
|---|---|---|---|
| 3,017,505 | 1/1962 | Clapp | 328—149 X |
| 3,162,758 | 12/1964 | Kamen et al. | 328—149 X |
| 3,223,929 | 12/1965 | Hofstad et al. | 307—233 X |
| 3,238,464 | 3/1966 | Rechter | 328—149 X |
| 3,278,851 | 10/1966 | Damon et al. | 328—149 X |

JOHN S. HEYMAN, Primary Examiner

U.S. Cl. X.R.

307—210, 236